(12) United States Patent
Burroughs et al.

(10) Patent No.: US 12,455,087 B2
(45) Date of Patent: Oct. 28, 2025

(54) CHILLED BEAM WITH ION GENERATOR

(71) Applicant: Price Industries, Inc.

(72) Inventors: Christopher Alan Burroughs, Braselton, GA (US); Nathaniel Brett Vaughn, Atlanta, GA (US); Kyu Ho Hwang, Alpharetta, GA (US)

(73) Assignee: Price Industries, Inc., Winnipeg (CA)

(*) Notice: Subject to any disclaimer, the term of this patent is extended or adjusted under 35 U.S.C. 154(b) by 494 days.

(21) Appl. No.: 18/055,074

(22) Filed: Nov. 14, 2022

(65) Prior Publication Data

US 2023/0151987 A1 May 18, 2023

Related U.S. Application Data

(60) Provisional application No. 63/279,395, filed on Nov. 15, 2021.

(51) Int. Cl.
*F24F 8/30* (2021.01)
*B03C 3/41* (2006.01)

(52) U.S. Cl.
CPC . *F24F 8/30* (2021.01); *B03C 3/41* (2013.01)

(58) Field of Classification Search
CPC .......................................................... F24F 8/30
See application file for complete search history.

(56) References Cited

U.S. PATENT DOCUMENTS

| 2,343,338 A | 3/1944 | Steel |
| 2002/0062948 A1 | 5/2002 | Horttanainen et al. |
| 2011/0150697 A1* | 6/2011 | Okano ............... F24F 8/192 422/4 |
| 2018/0058707 A1* | 3/2018 | Kimura ............... F24F 8/10 |
| 2022/0011013 A1† | 1/2022 | Carson |

OTHER PUBLICATIONS

The International Search Report/Written Opinion issued on Feb. 10, 2023 in corresponding International Patent Application No. PCT/US2022/049800; 8 pages.

\* cited by examiner
† cited by third party

*Primary Examiner* — Kevin Joyner
(74) *Attorney, Agent, or Firm* — Smith, Gambrell & Russell LLP

(57) ABSTRACT

A chilled beam with a bipolar ion generator located in the plenum. Conditioned air flows into the plenum through an air inlet. The plenum is pressurized by the primary air delivered from the HVAC system. The conditioned air exits the plenum through nozzles into a mixing chamber. The increased velocity of the conditioned air exiting through the nozzles induces return air through return an air inlet, past a heating/cooling coil, and into the mixing chamber. The conditioned air and the return air mix in the mixing chamber to create supply air that exits the chilled beam through supply air outlets. The electrodes of the bipolar ion generator are positioned at different locations in the plenum and are oriented in different directions to the direction of the conditioned air flowing into the plenum.

10 Claims, 16 Drawing Sheets

CHILLED BEAM WITH ION GENERATOR

FIELD OF THE INVENTION

This invention relates to a chilled beam air diffuser with an ion generator. The chilled beam may include a ceiling mounted linear chilled beam or a floor mounted cabinet chilled beam.

BACKGROUND OF THE INVENTION

Chilled beams, including for example floor mounted cabinet chilled beams and ceiling mounted linear chilled beams, are an alternate to traditional "all air" conditioning systems. Chilled beams use water to move energy through a building and service the building's sensible (dry) cooling load, relying on the air-side simply to meet ventilation and latent (wet) load requirements. Chilled beams reduce primary air volumes supplied to an occupied space and lead to energy savings, improved comfort levels, and ability to effectively integrate a dedicated outdoor air system (DOAS).

In order to provide uncontaminated or minimally contaminated supply air to an occupied space, the chilled beams may have filters in the return air path that remove dust and particulates from the supply air delivered to the occupied space. Such filters, however, generally lack the ability to remove certain small contaminants including viruses. Further, such filters can only collect contaminants in the return air that is induced into the chilled beam.

SUMMARY OF THE INVENTION

The present invention addresses the need for removing contaminants from the supply air by ionizing the air as it passes through the chilled beam and distributing ions directly into the occupied space. Particularly, in the case of a ceiling chilled beam, a bipolar ion generator may be placed in the primary air inlet duct, in the plenum, in the return air inlet, or in the supply air outlets. In connection with the present invention, the bipolar ion generator is located in the plenum.

Likewise, in the case of a cabinet chilled beam, bipolar ion generators may be placed in the primary air inlet duct, in the plenum, in the return air inlet, or in the supply air outlets. Again, in connection with the present invention, the bipolar ion generator is located in the plenum.

Further objects, features and advantages will become apparent upon consideration of the following detailed description of the invention when taken in conjunction with the drawings and the appended claims.

DETAILED DESCRIPTION OF THE PREFERRED EMBODIMENTS

Figure 5:
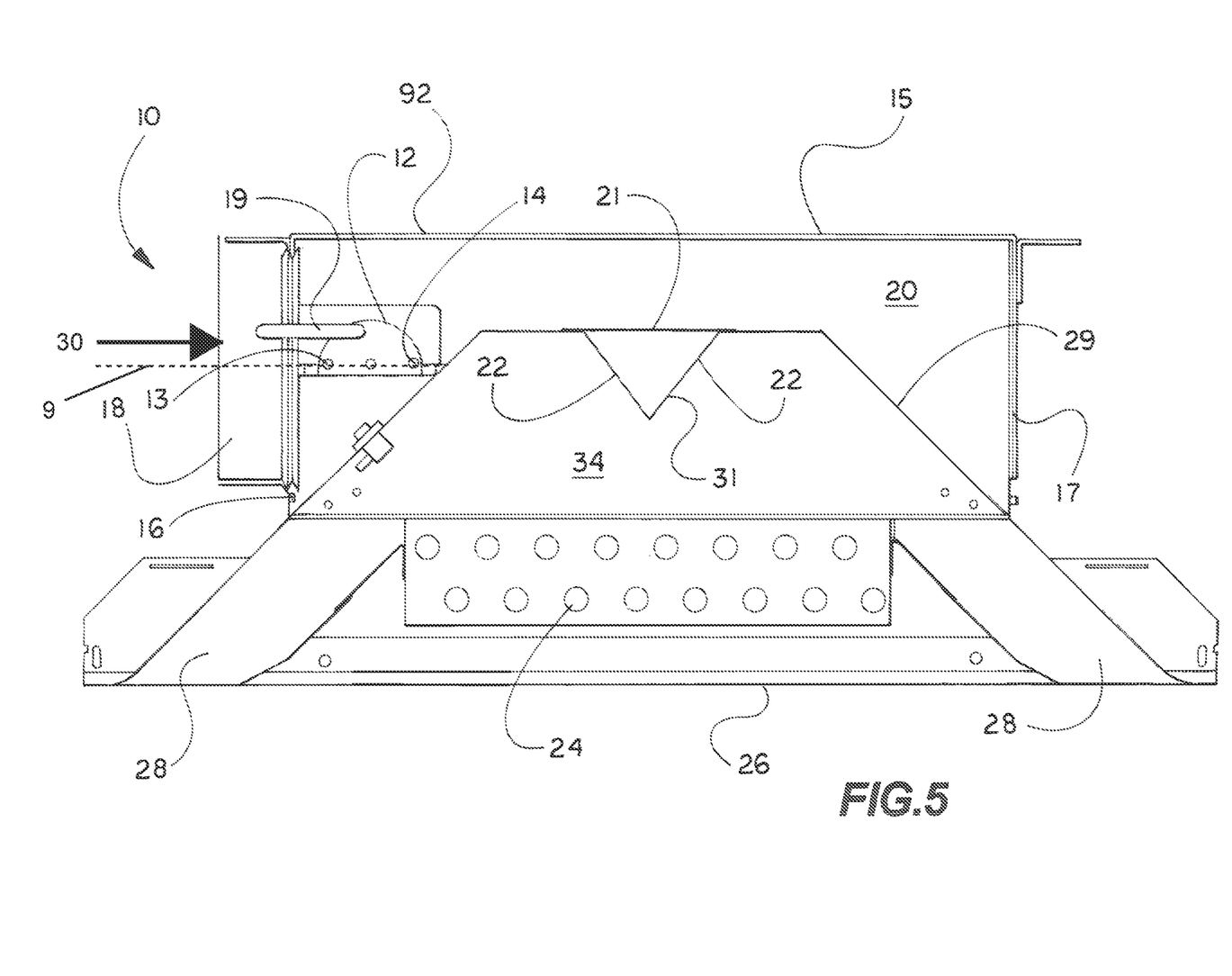
FIG. 5 is a schematic section elevation view of a second embodiment of the ceiling chilled beam in accordance with the present invention.
Figure 6:
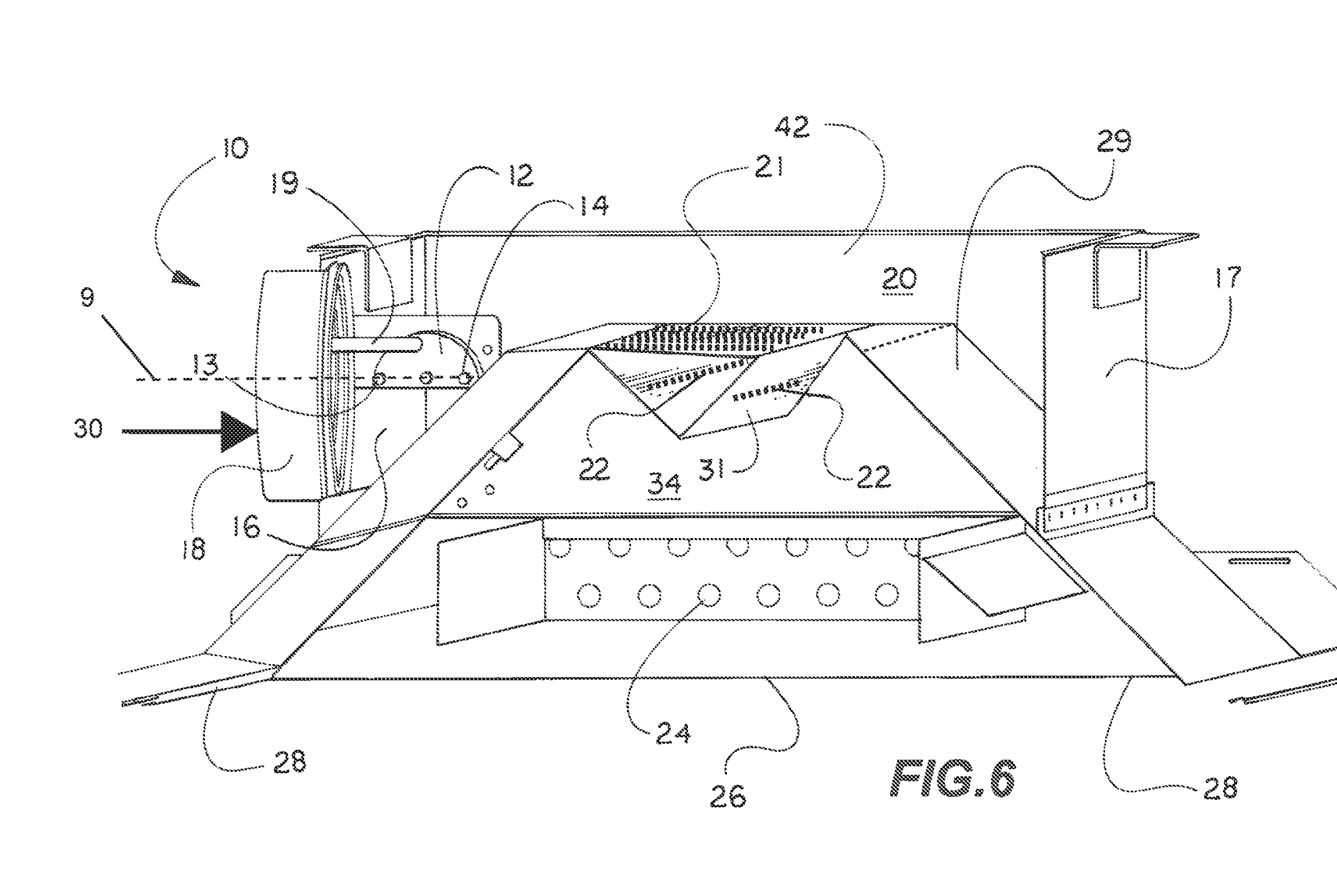
FIG. 6 is a schematic section perspective view of the second embodiment of the ceiling chilled beam with the top wall removed to expose internal detail in accordance with the present invention.
Figure 7:
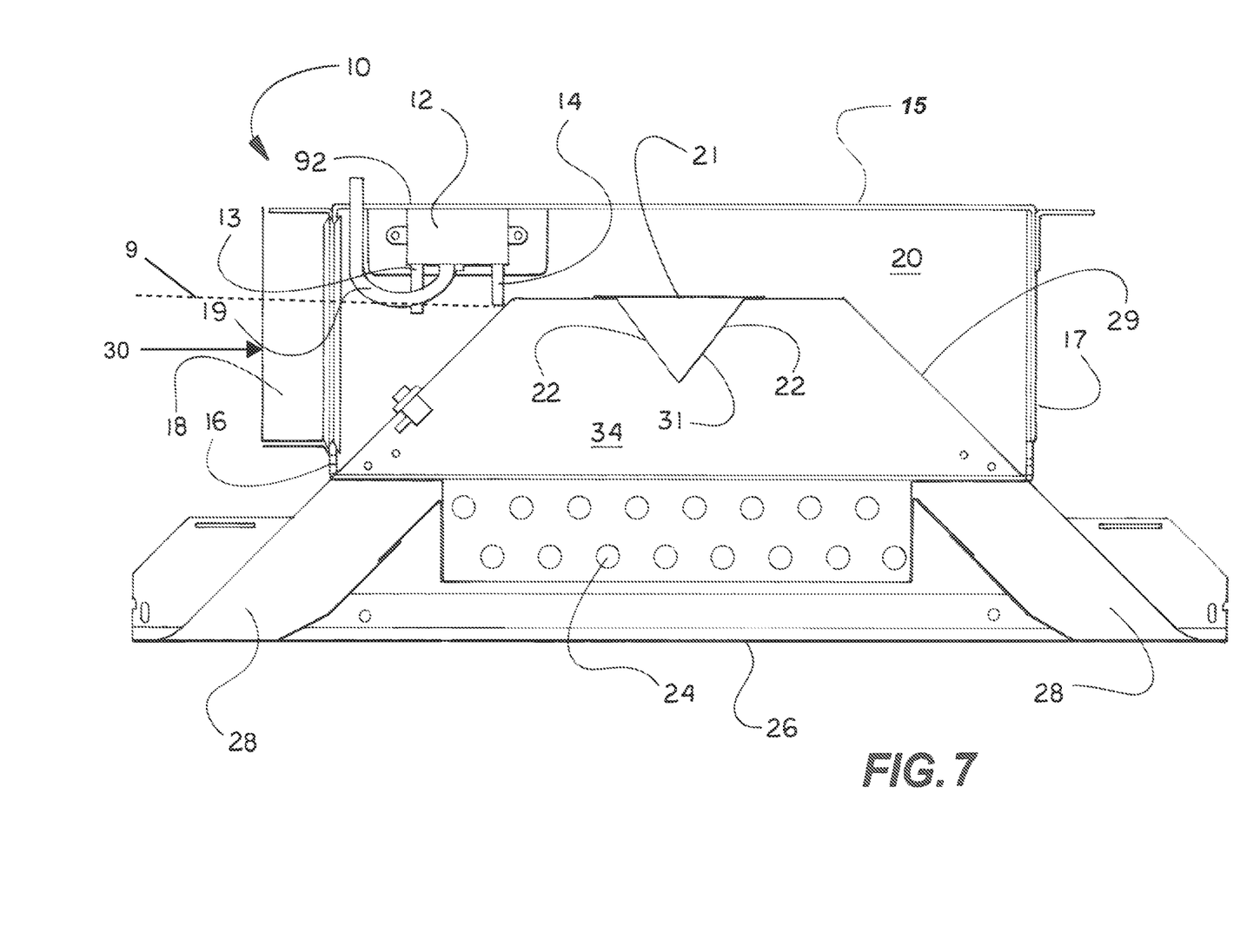
FIG. 7 is a schematic section view of a third embodiment of the ceiling chilled beam in accordance with the present invention.
Figure 8:
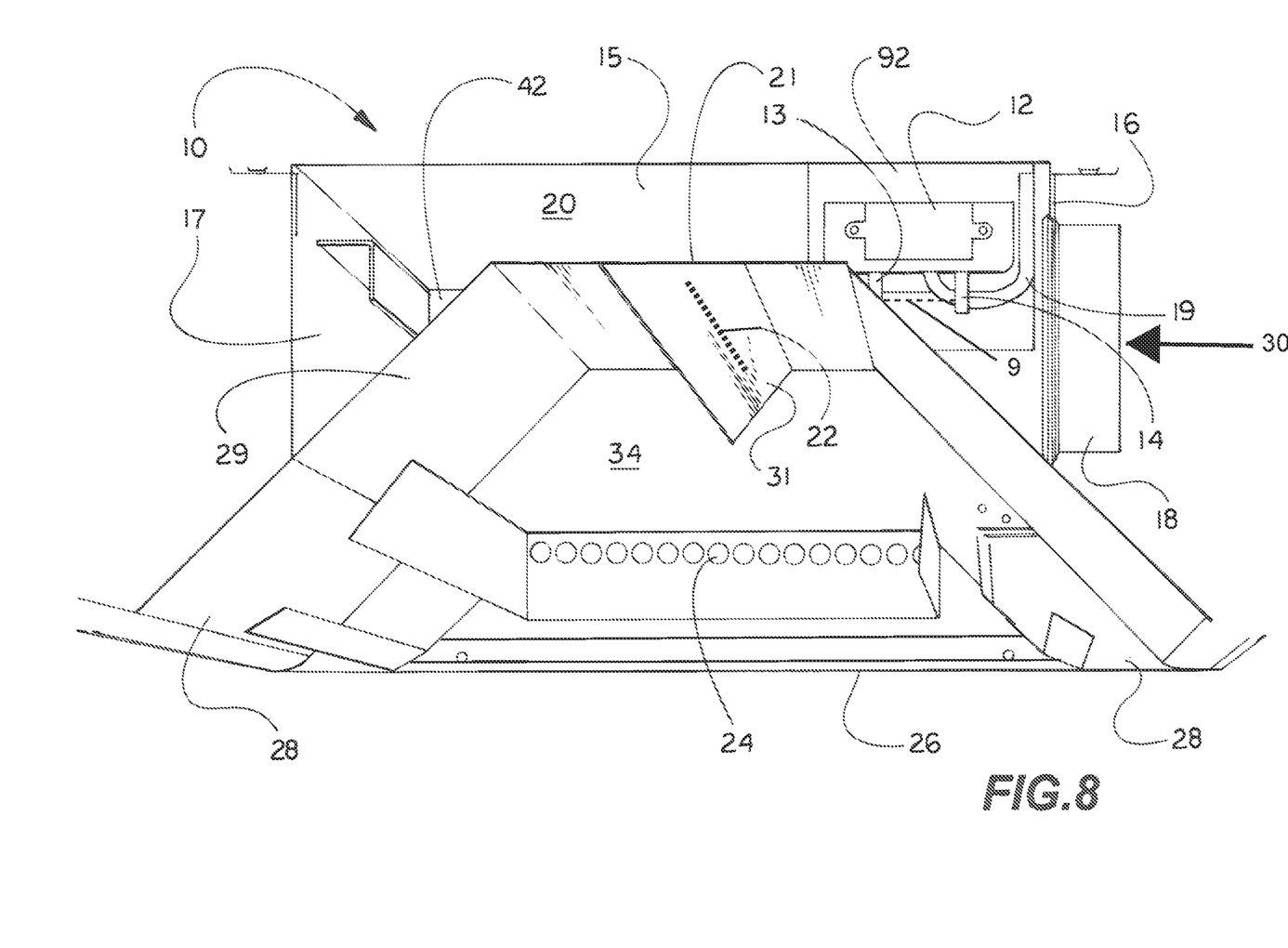
FIG. 8 is a schematic section perspective view of the third embodiment of the ceiling chilled beam in accordance with the present invention.
Figure 9:
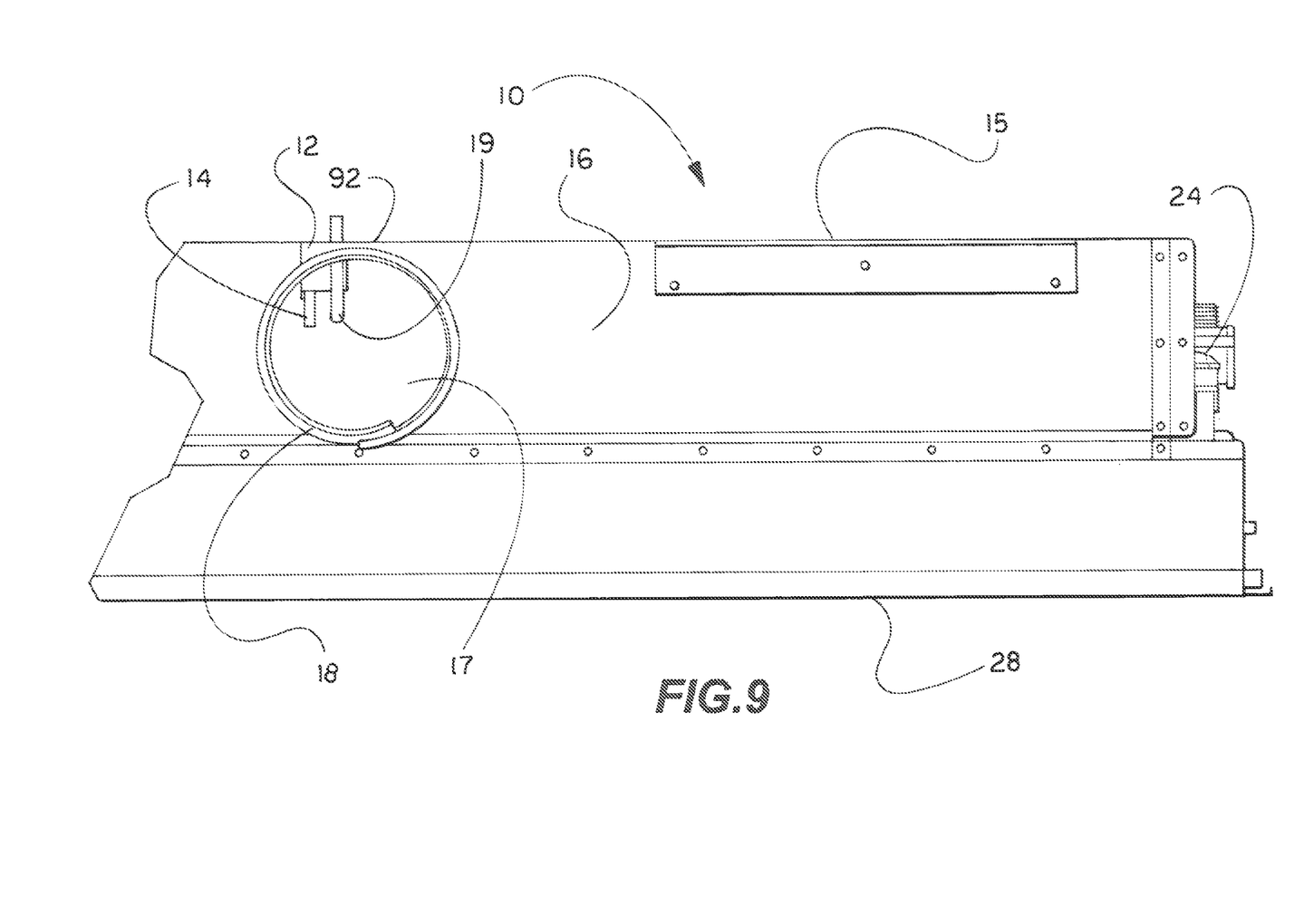
FIG. 9 is a schematic front elevation view of the third embodiment of the ceiling chilled beam in accordance with the present invention.
Figure 10:
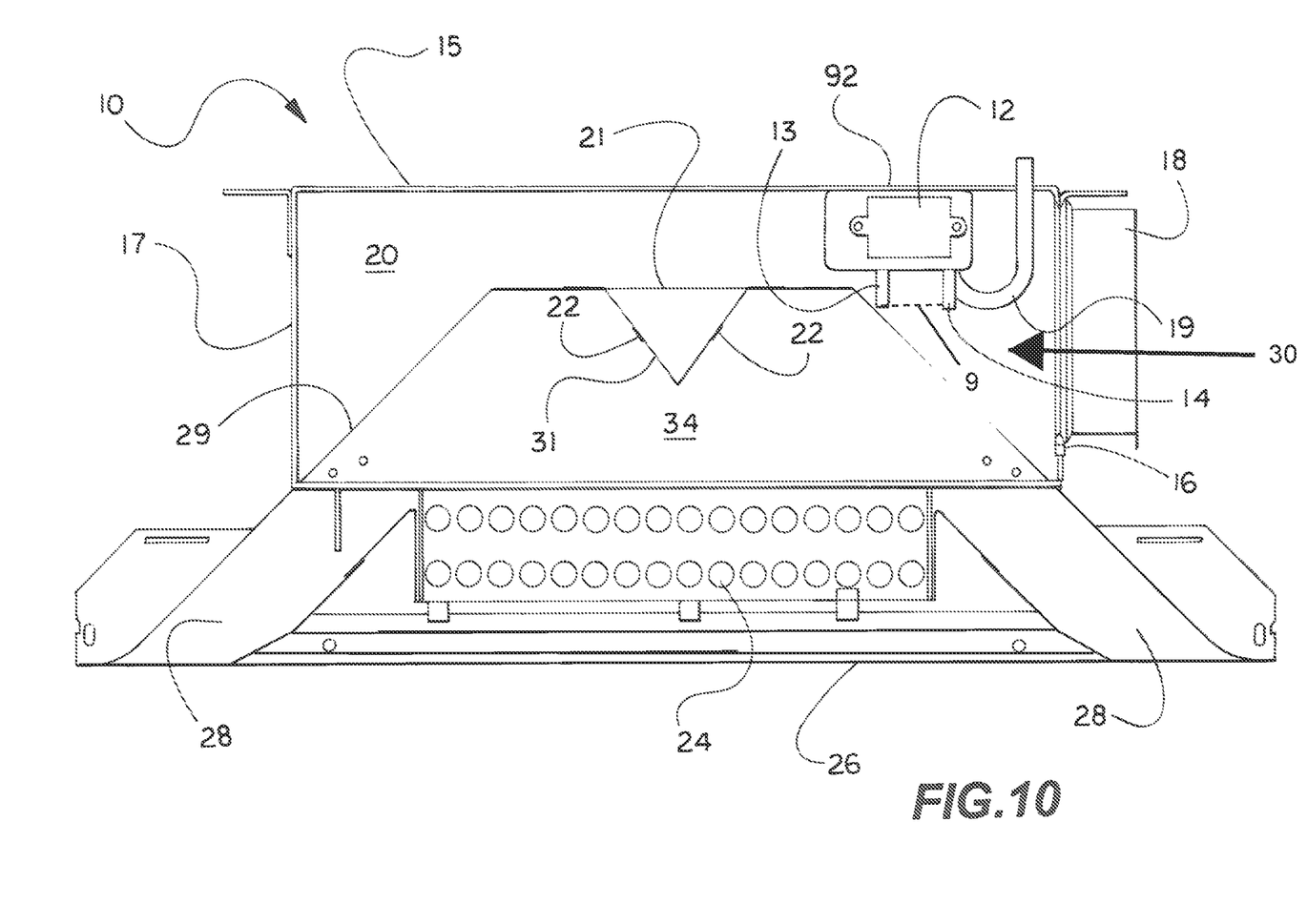
FIG. 10 is a schematic section elevation view of a fourth embodiment of the ceiling chilled beam in accordance with the present invention.
Figure 11:
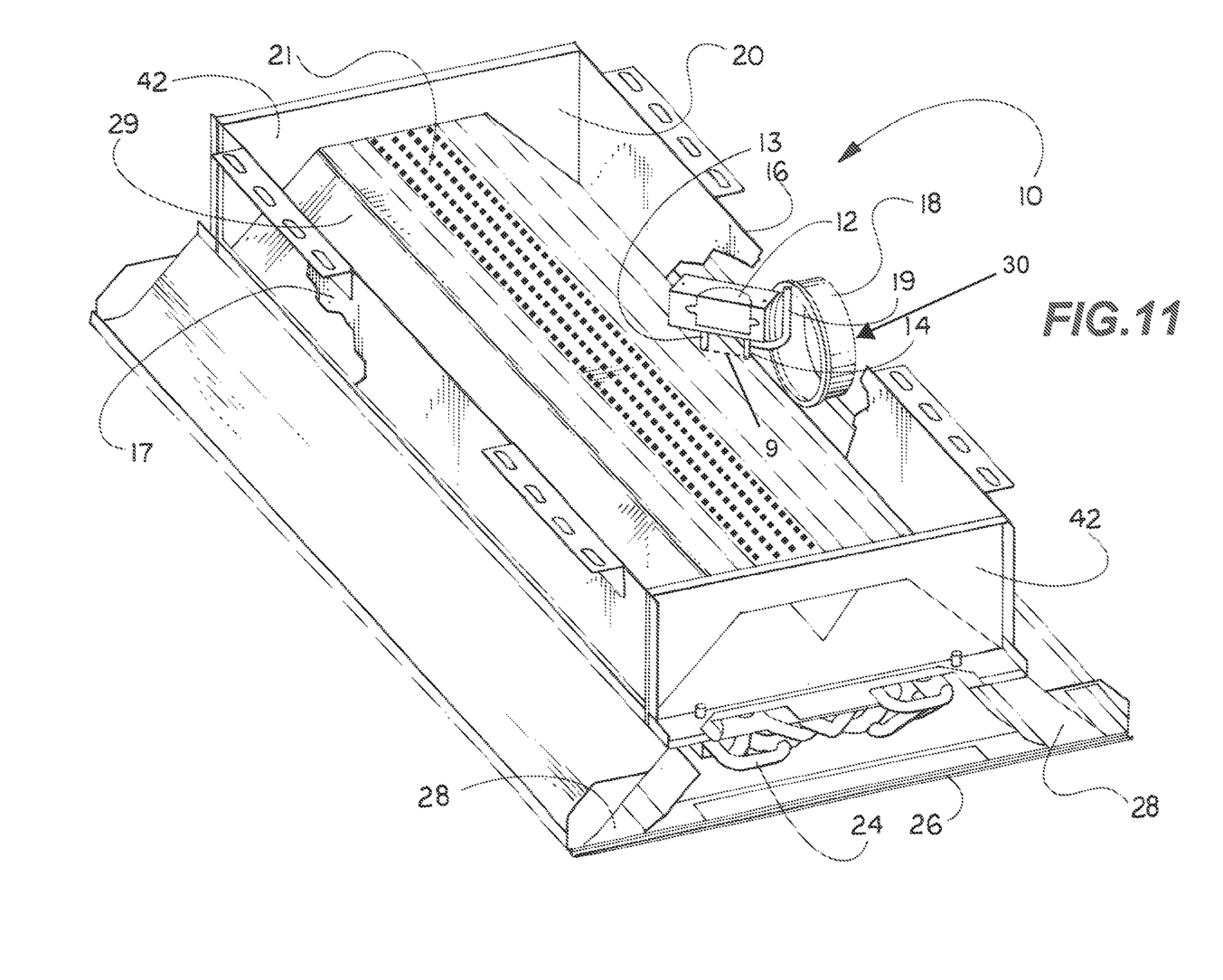
FIG. 11 is a schematic top perspective view of the fourth embodiment of the ceiling chilled beam with the top wall removed to expose internal detail in accordance with the present invention.
Figure 12:
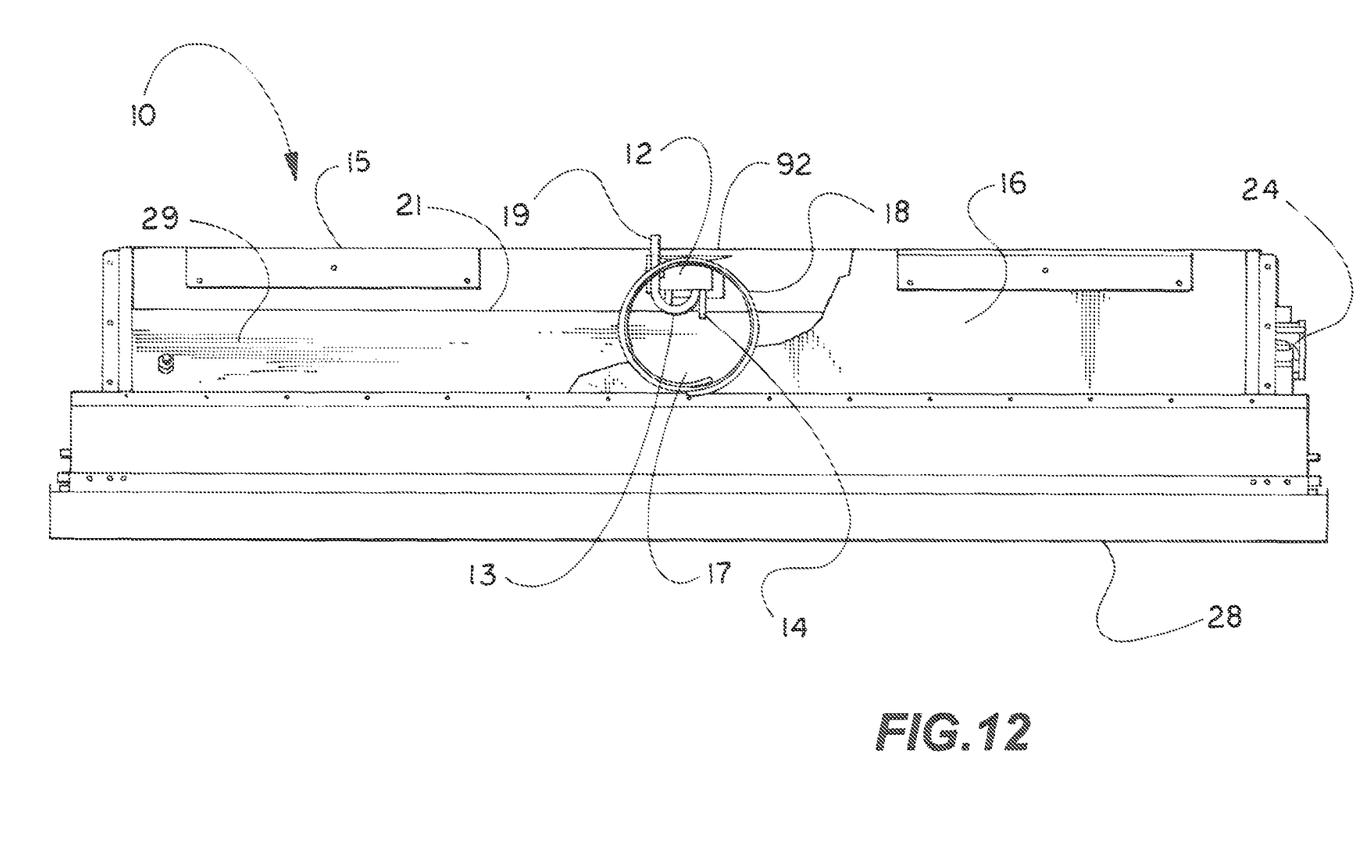
FIG. 12 is a schematic front elevation view of the fourth embodiment of the ceiling chilled beam in accordance with the present invention.
Figure 13:
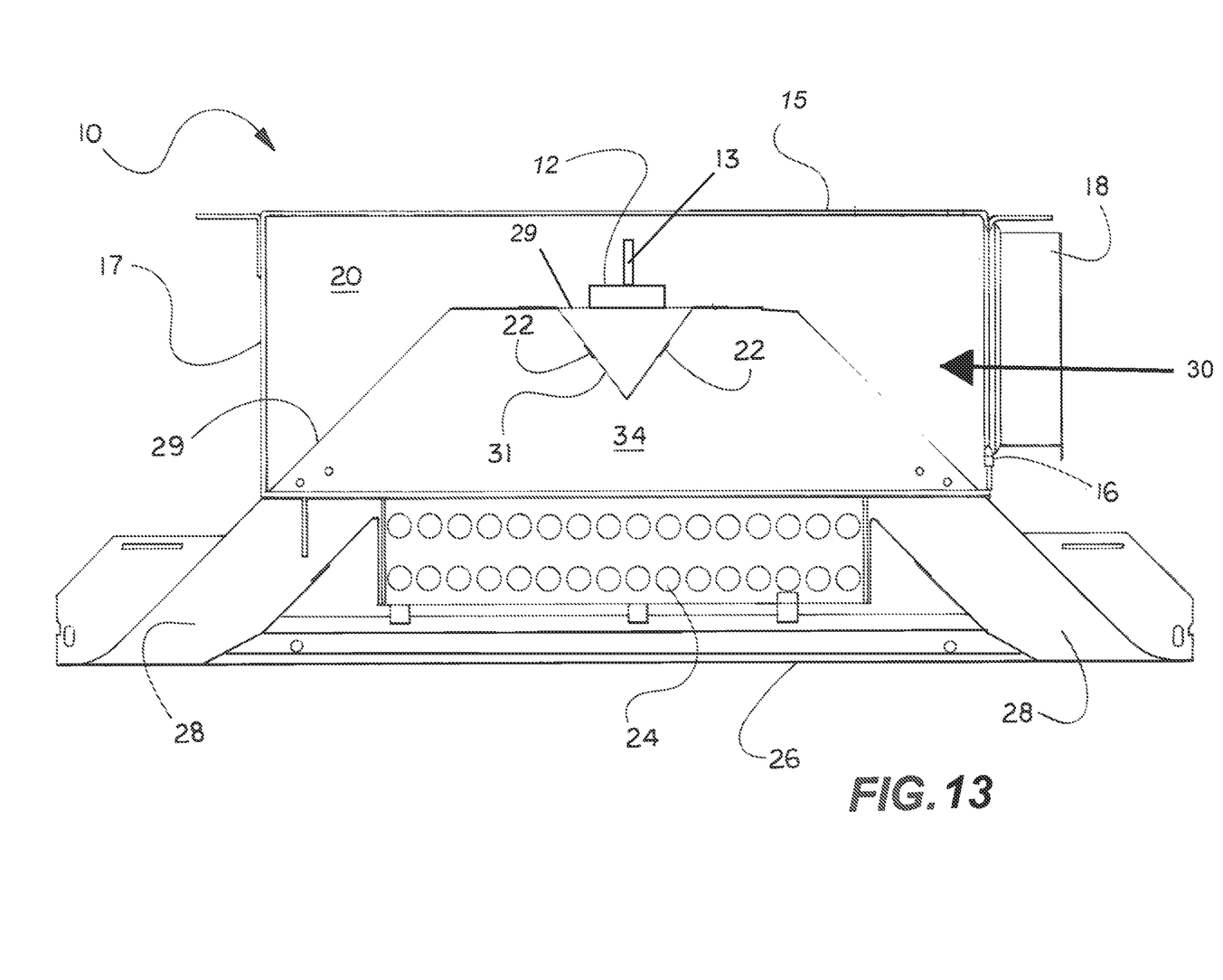
FIG. 13 is a schematic section elevation view of a fifth embodiment of the ceiling chilled beam with in accordance with the present invention.

FIGS. 1-4 illustrate a first embodiment of a ceiling mounted chilled beam. FIGS. 5-6 illustrate a second embodiment of a ceiling mounted chilled beam. FIGS. 7-9 illustrate a third embodiment of a ceiling mounted chilled beam. FIGS. 10-12 illustrate a fourth embodiment of a ceiling mounted chilled beam. FIG. 13 illustrates a fifth embodiment of a ceiling mounted chilled beam. The embodiments, first through fifth, of the ceiling chilled beam differ from each other based on the location and orientation of a bipolar ion generator 12. In the FIGS. 1-13, the same reference numerals will be used for the same parts throughout.

Figure 14:
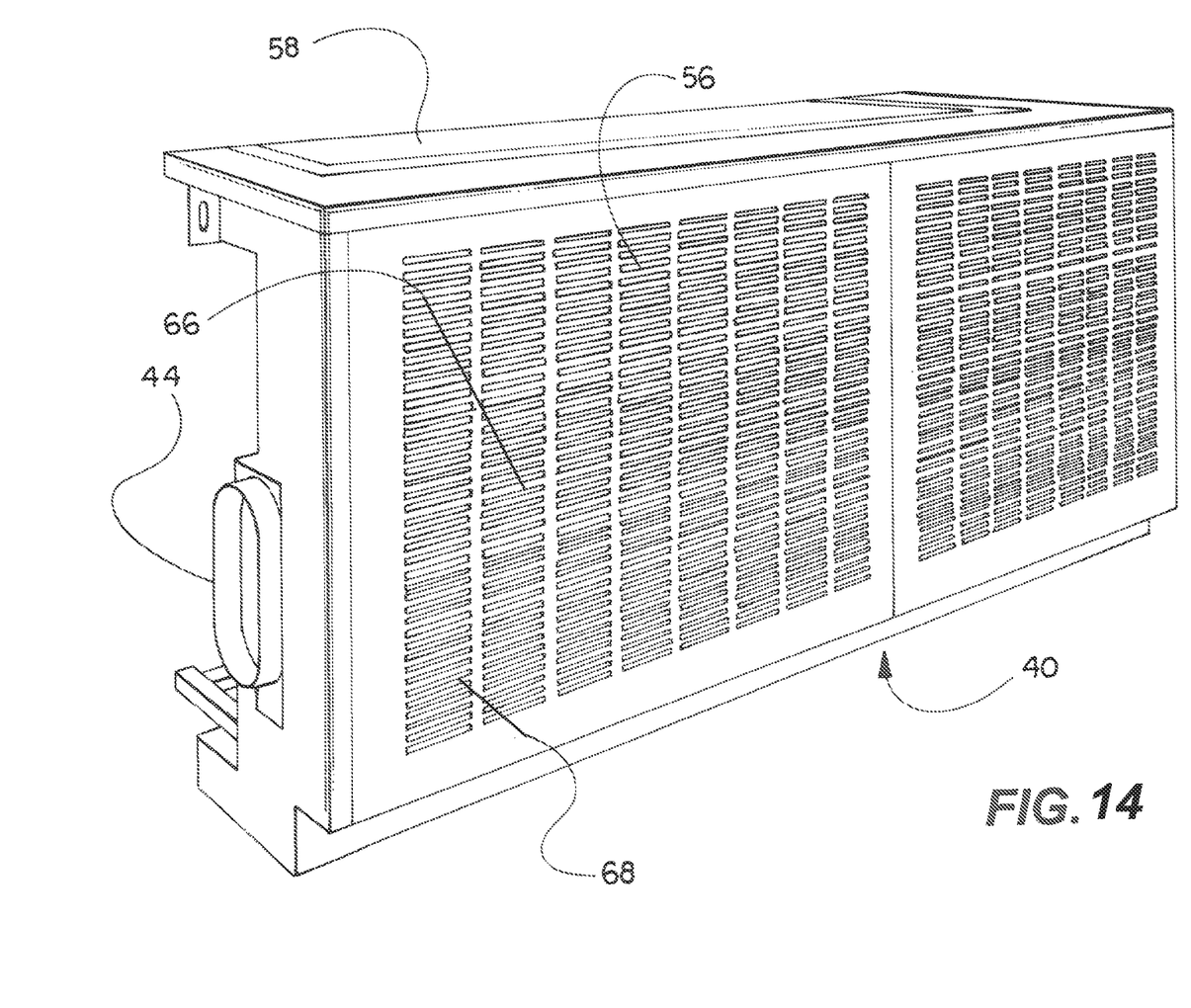
FIG. 14 is a room side perspective view of a cabinet two-way chilled beam in accordance with the present invention.
Figure 15:
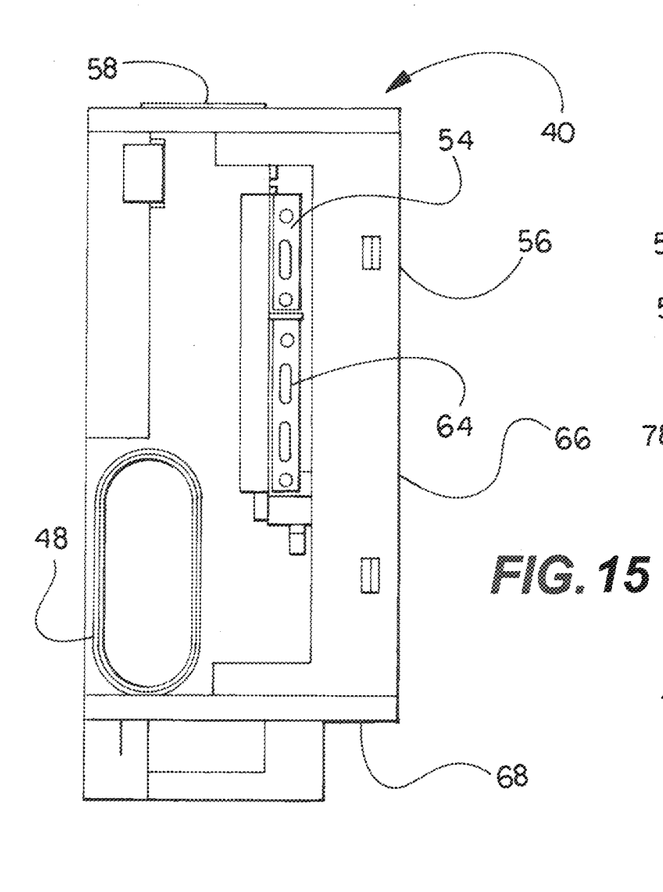
FIG. 15 is a schematic side elevation view of the cabinet two-way chilled beam in accordance with the present invention.
Figure 16:
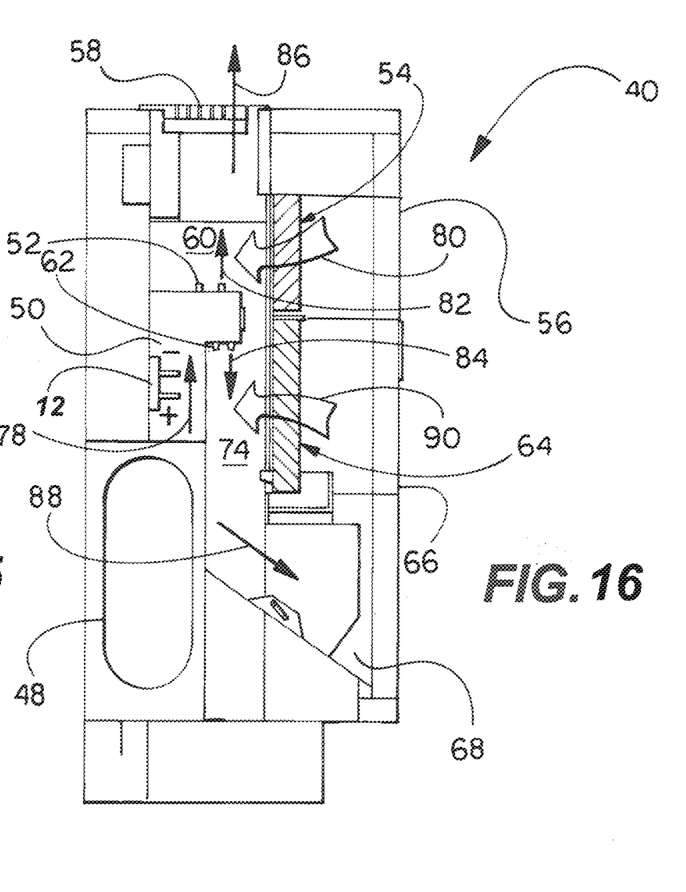
FIG. 16 is a schematic section elevation view of the cabinet two-way chilled beam in accordance with the present invention.
Figure 17:
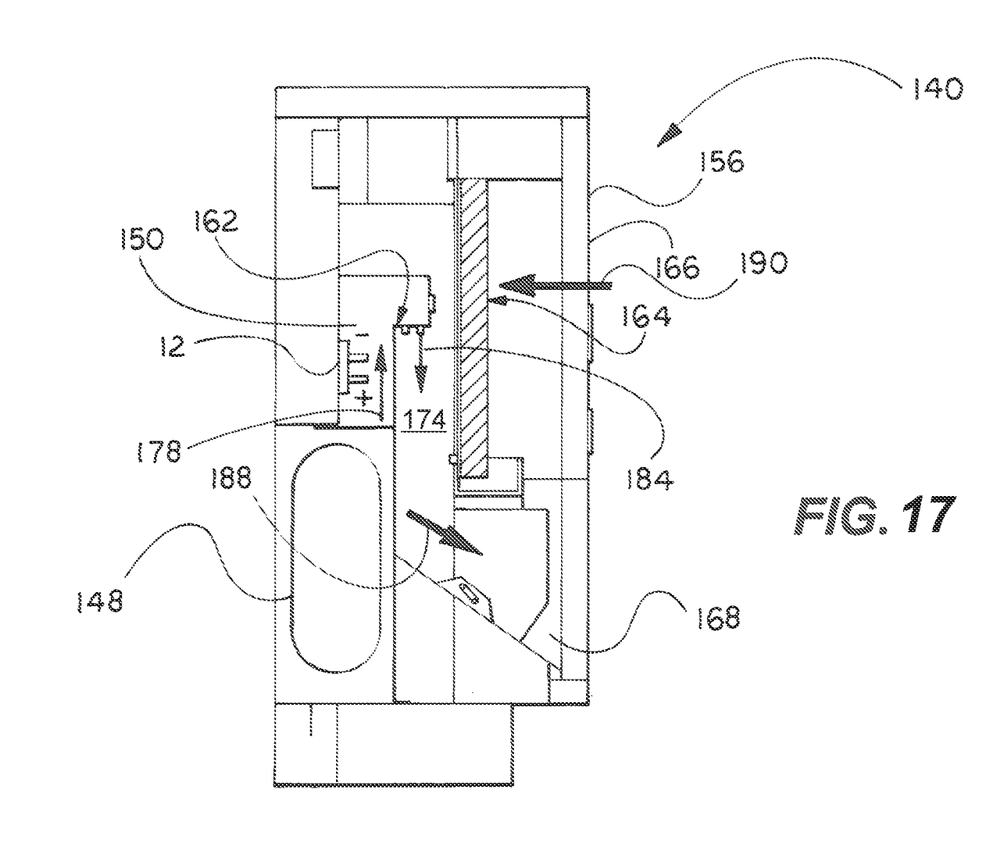
FIG. 17 is a schematic section elevation view of the cabinet one-way chilled beam in accordance with the present invention.

FIGS. 14-16 illustrate an embodiment of a cabinet two-way chilled beam. FIG. 17 illustrates an embodiment of a cabinet one-way chilled beam.

Figure 1:
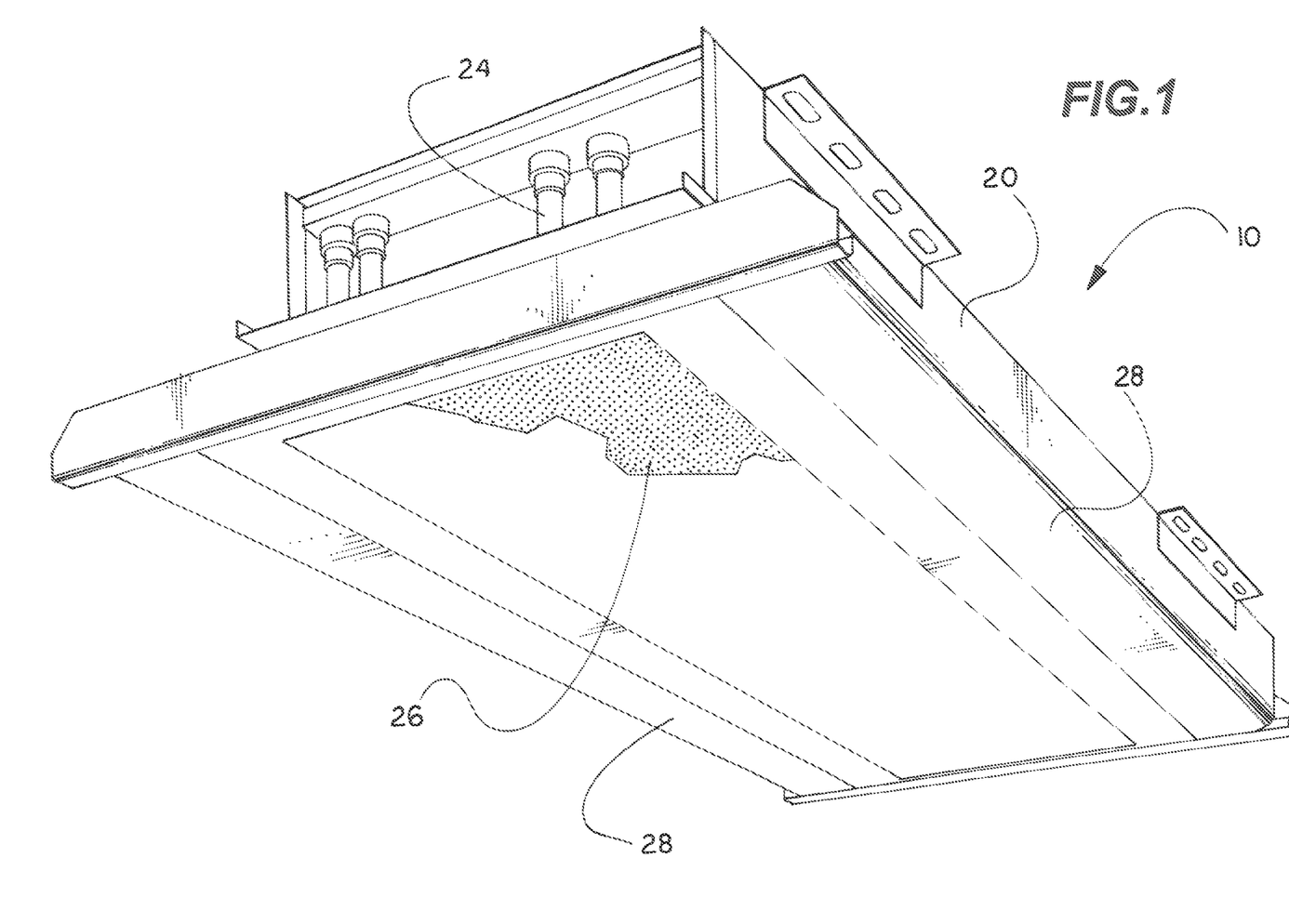
FIG. 1 is a bottom room side perspective view of a ceiling chilled beam in accordance with the present invention.

With reference to FIGS. 1, a ceiling chilled beam 10 has a primary air inlet duct 18, a plenum 20, induction nozzles 22, a mixing chamber 34, a heating/cooling coil 24, a return air inlet 26, and supply air outlets 28. The plenum 20 is formed by a top wall 15, a front wall 16, a back wall 17, and end walls 42. The bottom wall of the plenum is formed by a partition 29 including a V segment 31 with nozzles 22. A perforated plate 21 covers the V segment 31 in order to reduce noise and equalize pressure across the length of the V segment 31 of the ceiling chilled beam 10. The partition 29 separates the plenum 20 from the mixing chamber 34.

Figure 2:
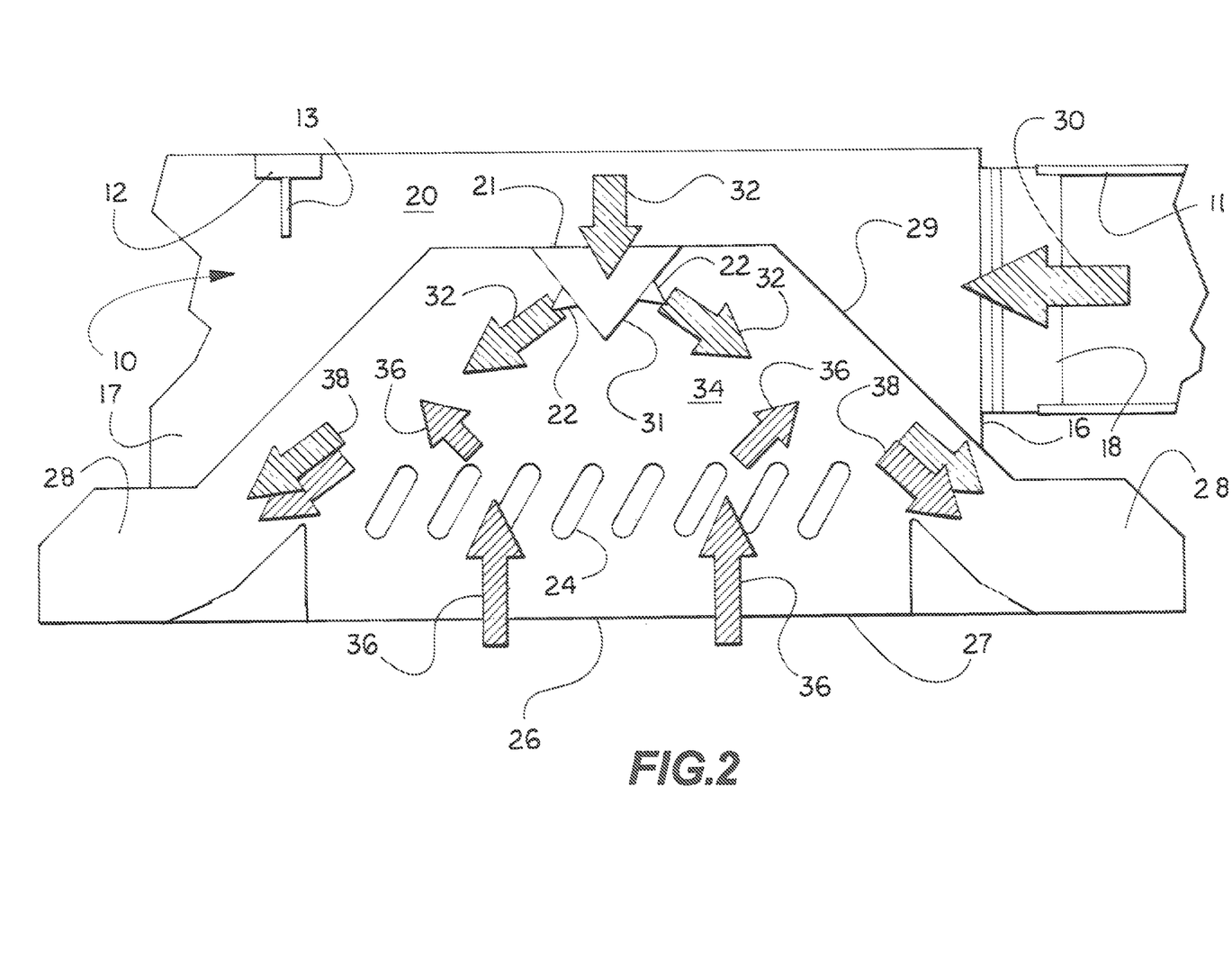
FIG. 2 is a schematic section elevation view of a first embodiment of the ceiling chilled beam in accordance with the present invention.

In operation and with reference to FIG. 2, conditioned primary air from an HVAC system is delivered through an HVAC duct 11 and through primary air inlet duct 18 into plenum 20 as indicated by the air flow direction arrow 30. The plenum 20 is pressurized by the primary air delivered from the HVAC system. The primary air exits the plenum 20 through nozzles 22 into mixing chamber 34 as shown by air flow direction arrows 32. The increased velocity of the primary air exiting through the nozzles 22 induces return air through return air inlet 26, past heating/cooling coil 24, and into mixing chamber 34 as indicated by air flow direction arrows 36. The primary air and the return air mix in mixing chamber 34 to create supply air that exits the chilled beam 10 through supply air outlets 28 as indicated by air flow direction arrows 38.

In order to remove contaminants from the air passing through the ceiling chilled beam 10, the air is ionized by bipolar ion generator 12. The bipolar ion generator 12 includes a power cord 19, a negative electrode 14 and a positive electrode 13. The electrodes are implemented by brushes, needle electrodes, or other electrodes known in the art. A suitable ionizer has carbon fiber brush electrodes, an ion output of greater than 350 million ions per cubic centimeter, and an air flow capacity of 0 to 3200 cubic feet per minute.

Figure 3:
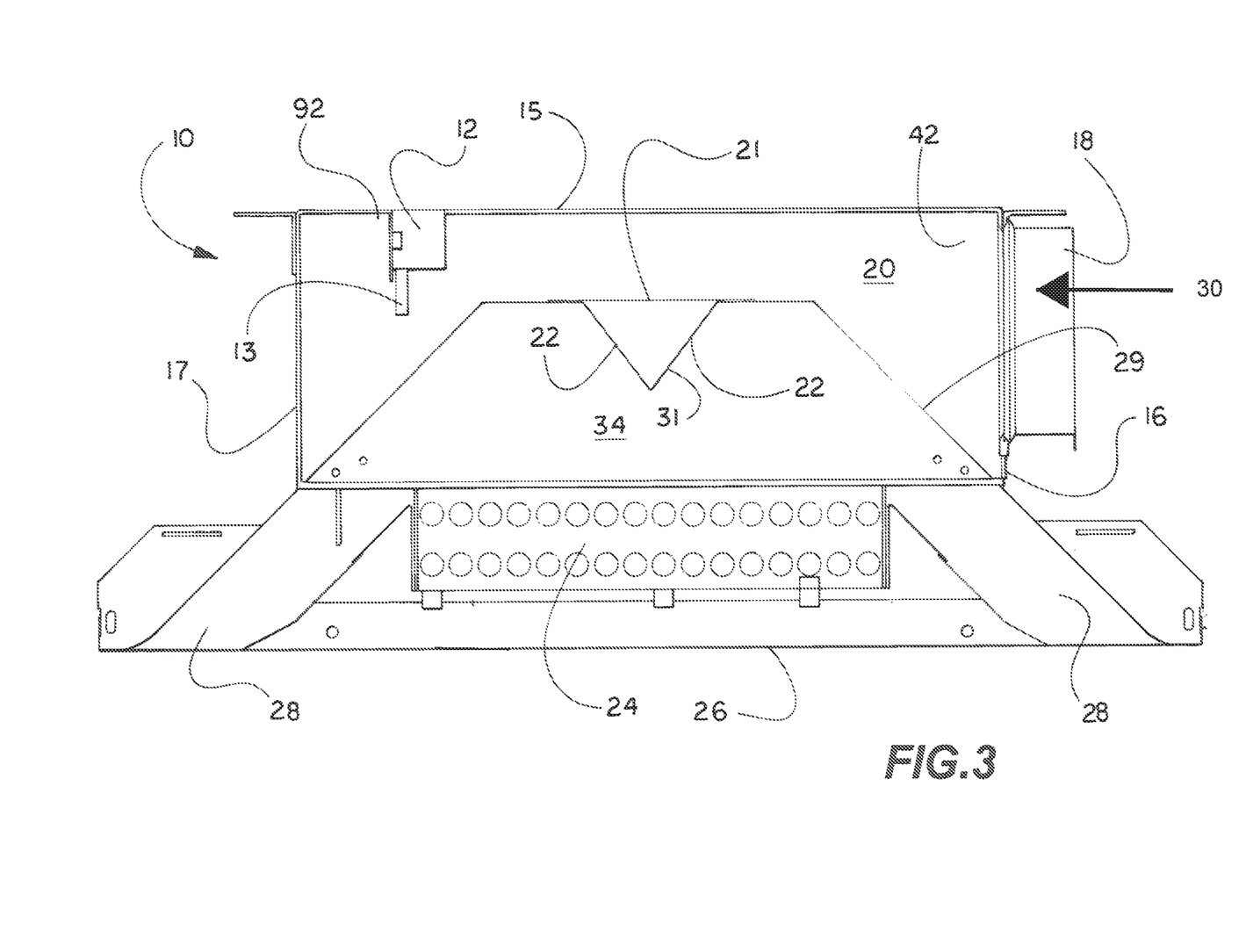
FIG. 3 is a schematic elevation view of the first embodiment of the ceiling chilled beam with a side wall removed to expose internal detail in accordance with the present invention.
Figure 4:
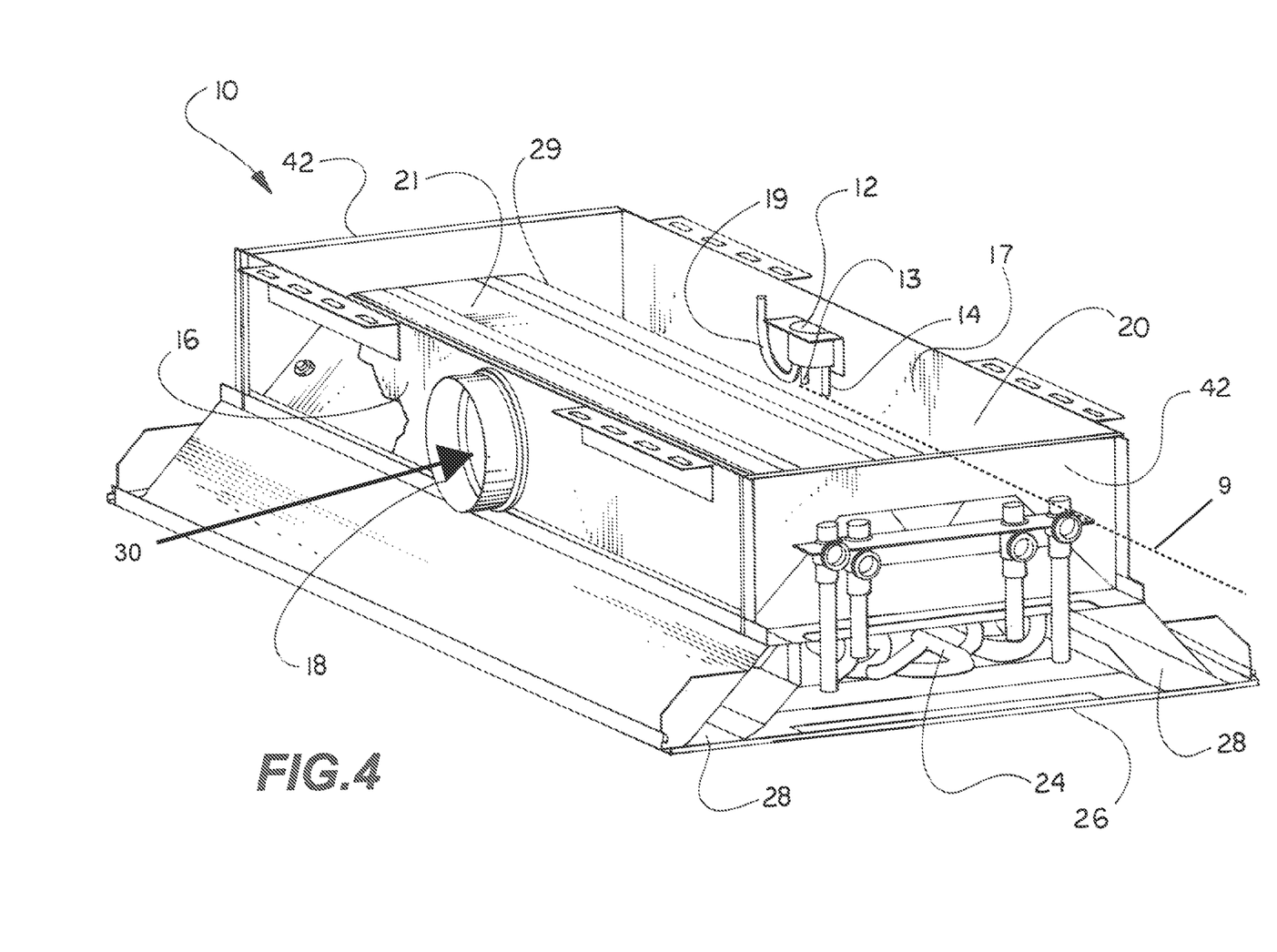
FIG. 4 is a perspective side view of the first embodiment of the ceiling chilled beam with the top wall removed to expose internal detail in accordance with the present invention.

FIGS. 2-4 illustrate a first embodiment for the ceiling chilled beam 10. In the configuration of the first embodiment, the bipolar ion generator 12 is attached to the top wall 15 adjacent the back wall 17 of the plenum 20 opposite the primary air inlet duct 18 as best shown in FIG. 3. An access panel 92 in the top wall 15 allows access to the electrodes 13 and 14 in order to clean the electrodes 13 and 14. The electrodes 13 and 14 are oriented so that an alignment line 9 (FIG. 4) passing through the electrodes 13 and 14 is parallel to the back wall 17 and perpendicular to the air flow direction 30.

FIGS. 5-6 illustrate a second embodiment for the ceiling chilled beam 10. In the configuration of the second embodiment, the bipolar ion generator 12 is attached to the front wall 16 adjacent the primary air inlet duct 18 and therefore, directly in the path of the conditioned air flowing into the plenum 20 in the air flow direction 30. Access panel 92 in the top wall 15 allows access to the electrodes 13 and 14 in order to clean the electrodes 13 and 14. As shown in both FIGS. 5 and 6, the alignment line 9 (FIG. 6) passes through the electrodes 13 and 14 of the bipolar ion generator 12, is parallel to the top wall 15, and is perpendicular to the front wall 16 of the plenum 20. Consequently, the air entering the plenum 20 through the primary air inlet duct 18 flows in the air flow direction 30 that is parallel to the alignment line 9 passing through the electrodes 13 and 14.

FIGS. 7-9 illustrate a third embodiment for the ceiling chilled beam 10. In the configuration of the third embodiment, the bipolar ion generator 12 is attached to the top wall 15 adjacent the primary air inlet duct 18 and therefore, directly in the path of the conditioned air flowing into the plenum 20 in the air flow direction 30 (FIGS. 7 and 9). Access panel 92 in the top wall 15 allows access to the electrodes 13 and 14 in order to clean the electrodes 13 and 14. As shown in FIGS. 7-9, the alignment line 9 passing through the electrodes 13 and 14 of the bipolar ion generator 12 is parallel to the top wall 15 and perpendicular to the front wall 16 of the plenum 20. Consequently, the air entering the plenum 20 through the primary air inlet duct 18 flows in the air flow direction 30 that is parallel to the alignment line 9 passing through the electrodes 13 and 14.

FIGS. 10-12 illustrate a fourth embodiment for the ceiling chilled beam 10. In the configuration of the fourth embodiment, the bipolar ion generator 12 is attached to the top wall 15 adjacent the primary air inlet duct 18 and therefore, directly in the path of the conditioned air flowing into the plenum 20 (FIG. 12). Access panel 92 in the top wall 15 allows access to the electrodes 13 and 14 in order to clean the electrodes 13 and 14. As shown in FIGS. 10 and 11, the alignment line 9 passing through the electrodes 13 and 14 of the bipolar ion generator 12 is parallel to the top wall 15, at an angle of approximately 45° to the front wall 16 of the plenum 20, and at an angle of approximately 45° to the air flow direction 30. The angle between the alignment line 9 and the front wall includes angles from 0° to 90°. Consequently, the air (air flow direction 30) entering the plenum 20 through the primary air inlet duct 18 flows in a direction that intersects the alignment line 9 passing through the electrodes 13 and 14 at angles from 0° (parallel to the air flow 30) to 90° (perpendicular to air flow 30).

FIG. 13 shows a fifth embodiment of the present invention with the ion generator 12 attached to the perforated plate 29. The electrodes of the ion generator 12 are oriented perpendicular to the air flow direction 30. The orientation of the electrodes of the ion generator 12 may be set at an angle from 0° to 90° with respect to the direction 30 of the air flow.

During testing of the chilled beam 10 shown in FIGS. 10-12, the angled between the air flow direction 30 and the alignment line 9 was varied from 0° (parallel to the air flow direction 30) and 90° (perpendicular to the air flow direction 30). When the ionization of the air was measured at both side supply air outlets 28, the chilled beam 10 produced the following ionization results shown in Table 1.

TABLE 1

| Ion Generator | |
|---|---|
| Electrode Alignment to Air flow | Ion Output Difference Compared To Perpendicular Orientation |
| Perpendicular to air flow (Baseline) | Baseline 100% |
| Parallel to air flow | 6% |
| 45 degree from air flow | 11% |
| 60 degree from air flow | 7% |
| 30 degree from air flow | 8% |

While the data in Table 1 above shows that perpendicular alignment of the electrodes with respect to the direction 30 of air flow produces the greatest concentration of ions in the occupied space, the other orientations in the Table 1 provide effective ion concentration in the occupied space.

FIGS. 14-16 illustrate a floor mounted cabinet two-way chilled beam 40. The cabinet two-way chilled beam 40 has a primary air inlet duct 48, a plenum 50, heating induction nozzles 52, cooling induction nozzles 62, a heating coil 54, a cooling coil 64, a heating return air inlet 56, a cooling return air inlet 66, a heating supply air outlet 58, and a cooling supply air outlet 68. In order to ionize the air received from an HVAC system through primary inlet duct 48 and delivered to an occupied space through supply air outlets 58 and 68, the air is ionized by one or more bipolar ion generators, such as bipolar ion generator 12, located in the plenum 50. The bipolar ion generator 12 has a positive electrode and a negative electrode. The electrodes are implemented by brushes, needle electrodes, or other electrodes known in the art. The two-way chilled beam 140 employs the ion generator 12 described above.

In the heating mode, conditioned primary air from the HVAC system is delivered through primary air inlet duct 48 into plenum 50 as shown by air flow direction arrow 78. The plenum 50 is pressurized by the primary air delivered from the HVAC system. The primary air exits the plenum 50 through heating induction nozzles 52 into mixing chamber 60 as shown by air flow direction arrow 82. The increased velocity of the primary air exiting through the heating induction nozzles 52 induces return air through return air inlet 56, past heating coil 54, and into mixing chamber 60 as shown by air flow direction arrow 80. The primary air and the return air mix in mixing chamber 60 to create heated supply air that exits the chilled beam 40 through supply air outlet 58 as shown by air flow direction arrow 86.

In the cooling mode, conditioned primary air from the HVAC system is delivered through primary air inlet duct 48 into plenum 50 as shown by air flow direction arrow 78. The plenum 50 is pressurized by the primary air delivered from the HVAC system. The primary air exits the plenum 50 through cooling induction nozzles 62 into mixing chamber 74 as shown by air flow direction arrow 84. The increased velocity of the primary air exiting through the cooling induction nozzles 62 induces return air through return air inlet 66, past cooling coil 64, and into mixing chamber 74 as shown by air flow direction arrow 90. The primary air and the return air mix in mixing chamber 74 to create cooled supply air that exits the chilled beam 40 through supply air outlet 68 as shown by air flow direction arrow 88.

In order to remove contaminants from the air passing through the cabinet chilled beam 40, the bipolar ion generator 12 is attached to the wall of the plenum 50. A line passing through the electrodes is oriented with respect to the direction of the air flow 78 at an angle from greater than 0° to less than 90°.

FIG. 17 illustrates a floor mounted cabinet one-way chilled beam 140. The cabinet one-way chilled beam 140 has a primary air inlet duct 148, a plenum 150, cooling induction nozzles 162, a cooling coil 164, a cooling return air inlet 166, and a cooling supply air outlet 168. In order to ionize the air received from an HVAC system through primary inlet duct 148 and delivered to an occupied space through supply air outlet 168, the air is ionized by one or more bipolar ion generators, such as bipolar ion generator 12 located in the plenum 150. The bipolar ion generator 12 has a positive electrode and a negative electrode. The electrodes are implemented by brushes, needle electrodes, or other electrodes known in the art. The one-way chilled beam 140 employees the ion generator 12 described above.

Generally, the one-way chilled beam 140 operates in the cooling mode. In the cooling mode, conditioned primary air from the HVAC system is delivered through primary air inlet duct 148 into plenum 150 as shown by air flow direction arrow 178. The plenum 150 is pressurized by the primary air delivered from the HVAC system. The primary air exits the plenum 50 through cooling induction nozzles 162 into mixing chamber 174 as shown by air flow direction arrow 184. The increased velocity of the primary air exiting through the cooling induction nozzles 162 induces return air 190 through return air inlet 166, past cooling coil 164, and into mixing chamber 174 as shown by air flow direction arrow 190. The primary air and the return air mix in mixing chamber 174 to create cooled supply air that exits the chilled beam 140 through supply air outlet 168 as shown by air flow direction arrow 188.

In order to remove contaminants from the air passing through the cabinet one-way chilled beam 140, the bipolar ion generator 12 is attached to the wall of the plenum 150. A line passing through the electrodes is oriented with respect to the direction of the air flow 178 at an angle from greater than 0° to less than 90°

While this invention has been described with reference to preferred embodiments thereof, it is to be understood that variations and modifications can be affected within the spirit and scope of the invention as described herein and as described in the appended claims.

We claim:
1. A chilled beam mounted within an occupied space comprising:
   a. a primary air inlet for receiving primary air and having an air flow direction through the primary air inlet;
   b. a plenum having walls for receiving primary air from the primary air inlet;
   c. at least one induction nozzle communicating with the primary air in the plenum;
   d. a mixing chamber separate from the plenum and downstream from the at least one induction nozzle for receiving primary air from the at least one induction nozzle;
   e. a return air inlet for receiving return air from the occupied space and conducting the return air into the mixing chamber;
   f. a supply air outlet for receiving air from the mixing chamber and directing the air into the occupied space; and
   g. a bipolar ion generator positioned within the plenum, the bipolar ion generator having a positive electrode and a negative electrode, wherein the positive electrode and negative electrode define an alignment line passing through both.

2. The chilled beam of claim 1 wherein the bipolar ion generator is positioned in the plenum so that the alignment line is oriented at an angle from 0° to 90° with respect to the air flow direction through the primary air inlet.

3. The chilled beam of claim 2, where and the alignment line is oriented at an angle of 90° to the air flow direction through the primary air inlet.

4. The chilled beam of claim 1, wherein the bipolar ion generator is positioned on a wall of the plenum opposite the primary air inlet.

5. The chilled beam of claim 1, wherein the bipolar ion generator is positioned on a wall of the plenum and the primary air inlet is positioned on the same wall.

6. The chilled beam of claim 1 wherein the plenum includes a top wall, a bottom wall, a front wall, a back wall, and end walls.

7. The chilled beam of claim 6, wherein the bipolar ion generator is attached to the top wall of the plenum.

8. The chilled beam of claim 6, wherein the primary air inlet is in the front wall and the bipolar ion generator is attached to the front wall adjacent the primary air inlet.

9. The chilled beam of claim 6, wherein the primary air inlet is in the top wall and the ion generators attached to the top wall adjacent the primary air inlet.

10. The chilled beam of claim 1, wherein a perforated plate separates the plenum from the at least one induction nozzle, and the bipolar ion generator is attached to the perforated plate.

* * * * *